United States Patent
Wheeler et al.

(10) Patent No.: US 7,282,089 B2
(45) Date of Patent: Oct. 16, 2007

(54) INKJET INK SET

(75) Inventors: James Walter Wheeler, West Chester, PA (US); John Stephen Locke, Hockessin, DE (US); Samit N. Chevli, Hockessin, DE (US); Sandra Laurine Issler, Newark, DE (US); Alicia Marie Walsh, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/267,464

(22) Filed: Nov. 4, 2005

(65) Prior Publication Data

US 2007/0101900 A1    May 10, 2007

(51) Int. Cl.
  *C09D 11/02*    (2006.01)
  *B41J 2/01*    (2006.01)
(52) U.S. Cl. .................... 106/31.27; 347/100
(58) Field of Classification Search .......... 106/31.27; 347/100
  See application file for complete search history.

(56) References Cited

U.S. PATENT DOCUMENTS

| | | | |
|---|---|---|---|
| 4,725,849 A * | 2/1988 | Koike et al. | 347/106 |
| 5,847,740 A | 12/1998 | Yammamoto et al. | |
| 6,051,036 A * | 4/2000 | Kusaki et al. | 8/494 |
| 6,508,549 B1 * | 1/2003 | Romano et al. | 347/100 |
| 6,513,923 B1 * | 2/2003 | Evans et al. | 347/100 |
| 6,656,228 B1 | 12/2003 | Sherwin et al. | |
| 2002/0081421 A1 | 6/2002 | Bagwell et al. | |
| 2004/0035320 A1 * | 2/2004 | Sano et al. | 106/31.6 |
| 2005/0057607 A1 * | 3/2005 | Tomioka et al. | 347/43 |
| 2005/0193499 A1 | 9/2005 | Chevli | |
| 2005/0235867 A1 * | 10/2005 | Jackson et al. | 106/31.27 |
| 2005/0284329 A1 * | 12/2005 | Jackson et al. | 106/31.6 |
| 2005/0284330 A1 * | 12/2005 | Jackson | 106/31.6 |
| 2006/0232650 A1 * | 10/2006 | Sugimoto et al. | 347/100 |
| 2007/0002110 A1 * | 1/2007 | Wheeler et al. | 347/100 |

* cited by examiner

*Primary Examiner*—Helene Klemanski
(74) *Attorney, Agent, or Firm*—Steven C. Benjamin; Bart E. Lerman

(57) ABSTRACT

The present invention pertains to a dye-based inkjet ink set and, more particularly, to a dye-based inkjet ink set suitable for printing on polyamide fabric.

20 Claims, No Drawings

INKJET INK SET

BACKGROUND OF THE INVENTION

The present invention pertains to a dye-based inkjet ink set and, more particularly, to a dye-based inkjet ink set suitable for printing on polyamide fabric.

Digital printing methods such as inkjet printing are becoming increasingly important for the printing of textiles and offer a number of potential benefits over conventional printing methods such as screen printing. Digital printing eliminates the set up expense associated with screen preparation and can potentially enable cost-effective short run production. Inkjet printing furthermore allows visual effects, like infinite pattern repeat sizes, that cannot be practically achieved with a screen-printing process.

One area of textile printing ideally suited to digital printing is the flag and banner market where short runs are common. However, printing of flags and banners presents unique challenges. For example, ink is printed on one side, but must penetrate the fabric so that the image is equally visible on the back (unprinted) side as on the front (printed) side. In addition, while the ink must travel through the fabric, it must not travel laterally causing blurring and bleeding. This seemingly contradictory set of conditions is not easily achieved. Furthermore, the printed products will typically be displayed in sunny areas and the colorants in the inks are preferably resistant to light fade.

U.S. Pat. No. 5,847,740 discloses an inkjet printing process on nylon cloth. US20050193499 discloses flag and banner printing methods and pretreatment solutions therefor. The disclosures of these documents are incorporated by reference herein for all purposes as if fully set forth.

Inkjet ink sets typically comprise the subtractive-primary colors cyan, yellow and magenta. Although lightfast yellow and magenta dyes suitable for printing on flag and banner stock are available, cyan dyes currently available have a lightfastness that is less than desirable. Consequently, portions of the color gamut where cyan is the predominate colorant have substantially lower lightfastness than other parts of the gamut where more lightfast colorants are used. In addition, portions of the gamut where cyan is even a minor component will show significant hue shifting as the system ages. Preferably, all parts of the color gamut would have a similar, high level of lightfastness.

It is an object of this invention to provide an inkjet ink set with wide gamut, wherein all inks have desirable lightfastness, such that the set is advantageous for printing on polyamide fabric.

SUMMARY OF THE INVENTION

In accord with an objective of this invention, the present invention, in one aspect, pertains to a dye-based inkjet ink set comprising at least two differently colored inks, wherein at least one of the inks (a first ink) is a green ink comprising a green dye in an aqueous vehicle. The green dye is preferably selected from the group consisting of Acid Green 28, Acid Green 25, Acid Green 81, Acid Green 84 and mixtures thereof, and more preferably Acid Green 28. In a preferred embodiment, the first ink comprises the green dye in an amount of from about 2.5 wt % to about 7.0 wt %, based on the total weight of the ink.

In a preferred embodiment, the ink set further comprises a second ink that is blue and comprises Acid Blue 260 dye in an aqueous vehicle.

In another preferred embodiment, the ink set comprises one or more of inks (a) through (f) defined as follows:

(a) a yellow ink comprising Acid Yellow 79 dye (preferably from about 7 wt % to about 11 wt %) in an aqueous vehicle;

(b) a violet ink comprising Acid Violet 48 dye (preferably from about 4 wt % to about 8 wt %) in an aqueous vehicle;

(c) a black ink comprising Acid Black 194 (preferably from about 6 wt % to about 10 wt %) in an aqueous vehicle;

(d) a magenta ink comprising Reactive Red 245 (preferably from about 8 wt % to about 12 wt %) in an aqueous vehicle; and/or (e) an orange ink comprising Reactive Orange 95 (preferably from about 5 wt % to about 15 wt %) in an aqueous vehicle.

(f) a red ink comprising Acid Red 361 (preferably from about 4 wt % to about 8 wt %) in an aqueous vehicle; and/or The preferred amounts of colorant are expressed as weight percent of the total weight of ink.

In another aspect, the present invention pertains to an ink set comprising a first, second ink and third ink, and optionally up to five more additional (fourth, fifth, sixth, seventh and eighth) inks. The first ink is the green ink described above, the second ink is the blue ink described above, and the third and any optional additional ink(s) are selected, in any combination, without duplication, from inks (a) through (f) as described above.

The prescribed inks are lightfast and do not include a cyan ink. The presence of both a green and blue ink can largely compensate (in gamut) for lack of cyan, and avoiding cyan eliminates the problem of poor lightfastness associated with currently available cyan dyes. In one preferred embodiment, the ink set does not include a cyan ink.

In yet another aspect, the present invention pertains to a method for ink jet printing, comprising the steps of:

(a) providing an ink jet printer that is responsive to digital data signals;

(b) loading the printer with a polyamide fabric to be printed;

(c) loading the printer with an inkjet ink set as set forth above; and (d) printing onto the substrate using the inkjet ink set in response to the digital data signals.

Optionally (and preferably), the process further comprises the following steps:

(e) heating the printed fabric with steam-treatment to set the printed inks, and (f) washing the steam-treated fabric.

In still another aspect, the present invention pertains to polyamide fabric article printed according the above inkjet printing method.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or oneor more) unless the context specifically states otherwise.

Further, reference to values stated in ranges include each and every value within that range.

DETAILED DESCRIPTION OF THE PREFERRED EMBODIMENTS

Colorants

The inks of the present ink set are characterized by the presence of particular, specified colorants. The colorants (dyes) are substantially soluble in the ink vehicle (aqueous).

Reference to the specified dyes is made by their "C.I." designation established by Society Dyers and Colourists, Bradford, Yorkshire, UK and published in the *The Color Index*, Third Edition, 1971. Sources of these dyes are generally well known to those of ordinary skill in the relevant art.

The present ink set is required to comprise a green ink based on a dye selected from one or more of Acid Green 28, Acid Green 25, Acid Green 81 and Acid Green 84, and preferably Acid Green 28.

The ink set further comprises at least one more additional ink, and optionally up to seven or more additional inks (up to eight or more total), wherein the colorant in each of the additional ink(s) is selected from the group consisting of Acid Blue 260, Acid Yellow 79, Acid Violet 48, Acid Black 194, Reactive Red 245, Reactive Orange 95 and Acid Red 361, with each ink in the each set being based on a different dye. In each case, the specified dye is the primary or sole colorant in the ink.

Vehicle

The vehicle is a carrier for the colorant. An "aqueous vehicle" refers to a vehicle comprised of water or a mixture of water and at least one water-soluble organic solvent (co-solvent). Selection of a suitable mixture depends on requirements of the specific application, such as desired surface tension and viscosity, the selected colorant, and compatibility with substrate onto which the ink will be printed.

Examples of water-soluble organic solvents include alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether An aqueous vehicle will typically contain about 30% to about 95% water with the balance (i.e., about 70% to about 5%) being the water-soluble solvent.

Additives

Other ingredients, additives, may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont). Surfactants are typically used in the amount of about 0.01 to about 5% and preferably about 0.2 to about 2%, based on the total weight of the ink.

Polymers may be added to the ink to improve durability. The polymers can be soluble in the vehicle or dispersed (e.g. "emulsion polymer" or "latex"), and can be ionic or non-ionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70 wt % to about 99.8 wt %, and more typically from about 80 wt % to about 99 wt %. Colorant is generally present in amounts up to about 15 wt %. For flag and banner applications, the colorant is typically in the range of from about 3 wt % to about 12 wt %. Percentages are weight percent of the total weight of ink.

Other ingredients (additives), when present, generally comprise less than about 15 wt %, based on the total weight of the ink. Surfactants, when added, are generally in the range of from about 0.2 wt % to about 3 wt %, based on the total weight of the ink. Polymers can be added as needed, but will generally be less than about 15 wt %, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower. The ink has physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic.

Ink Set

The term "ink set" refers to all the individual inks or other fluids an inkjet printer is equipped to jet. The ink set of the present invention is required to contain a green ink (first ink) as described above. Preferably, the ink set further comprises a second ink that is blue and comprises Acid Blue 260 dye in an aqueous vehicle.

The presence of both a green and a blue ink can largely compensate (in gamut) for lack of cyan. By some estimates, the gamut volume for an ink set with a blue ink and a green ink, and no cyan ink, is only about 6% less than the same ink set with a cyan ink included. The gamut volume of an ink set with no cyan ink and only one of a blue ink or a green ink is estimated to be 15-20% less than the same ink set which includes both blue and green inks.

Additional inks in the ink set are preferably selected from inks (a) through (f) as previously defined. Thus, a third ink can be any one of inks (a) through (f). A fourth ink can also be any one of inks (a) through (f), provided that such fourth ink is not the same of inks (a) through (f) as selected for the third ink. A fifth ink can also be any one of inks (a) through (f), provided that such fifth ink is not the same of inks (a) through (f) as selected for the third and fourth inks. Likewise, six-, seven- and eight-member ink sets can be constructed. The additional inks are all selected from inks (a) through (f) and each of these additional inks is different. The additional inks can be selected in any combination. The preferred amounts of colorant are expressed as weight percent of the total weight of ink.

Substrate

The instant ink set is especially advantageous for printing substrate that is synthetic polyamide fabric, and particularly flag and banner stock. Most commonly, the synthetic polyamide fabric fibers are nylon-6 and/or nylon-6,6 fibers. For flag and banner stock, the fabric is generally from about 70 to about 200 deniers. A commercial example of such stock is SolarMax® 185 bright Nylon 200 denier, SGS-667/50, prepared for print; and SolarMax® 185 bright HT Nylon 70 denier, SGS-773/76, prepared for print, both commercially available from Glen Raven Mills (Glen Raven, N.C.). SolarMax® is a trademark of Invista.

The fabric is commonly pretreated prior to printing. Application of the pretreatment to the fabric can be any convenient method and such methods are generally well-known in the art. One example is an application method referred to as padding. In padding, a fabric is dipped in the pretreatment solution, then the saturated fabric is passed through nip rollers that squeeze out the excess solution. The amount of solution retained in the fabric can be regulated by the nip pressure applied by the rollers. Other pretreatment techniques include spray application wherein the solution is applied by spraying on the face or face and back of the fabric. The wet pick-up of pretreatment solution is preferably from about 20 and about 100 grams of solution, and more preferably from about 25 to about 75 grams of solution, per 100 grams of fabric.

After application of pretreatment the fabric is dried in any convenient manner. The final percent moisture is (approximately) equal to the equilibrium moisture of the pretreated fabric at ambient temperature, and can vary somewhat depending on the relative humidity of the surrounding air.

The resins remaining in the fabric after drying provide the absorbent layer for the inkjet inks during printing. It will be appreciated that sufficient resin must be present to absorb the ink load applied. On the other hand, the presence of too much resin may prevent proper penetration. Routine optimization will reveal appropriate coating levels for a given printer and ink set.

In addition to previously incorporated US20050193499, other suitable pretreatments include those disclosed in U.S. Pat. No. 6,656,228 and US20020081421, the disclosures of which are incorporated by reference herein for all purposes as if fully set forth.

Printing Method

Printing can be accomplished by any inkjet printer equipped for handling and printing fabric. Commercial printers include, for example, the Dupont™ Artistri™ 3210 and 2020 printers, and the Mimaki TX series of printers.

The amount of ink laid down on the fabric can vary by printer model, by print mode (resolution) within a given printer and by the percent coverage need to achieve a given color. The combined effect of all these considerations is grams of ink per unit area of fabric for each color. In one embodiment, ink coverage is preferably from about 5 to about 17 grams of ink per square meter of fabric. There is a balance between the ink density needed to achieve a desired color and the absorption capacity of the coating resins in the pretreatment.

Printed fabric will typically be post-treated according to procedures well-known in the textile art. A preferred post treatment is to heat the printed fabric with steam-treatment to set the printed inks, and washing the steam-treated fabric.

EXAMPLES

Preparation of Inks

Inks were prepared according to the formulations in the following tables wherein the amounts shown are weight percent based on the total weight of the ink.

Ingredients were mixed together and filtered. Water was deionized. Colorants were "inkjet grade" meaning that they were relatively pure and free of excessive amounts of salts. The "Dye" refers to the dye with CI designation listed for each ink and is given on a solids basis. Surfynol® 440 is a surfactant from Air Products Corp (Allentown, Pa., USA). Proxel™ GXL is a Biocide from Avecia (Wilmington, Del., USA). Trizma is tris(hydroxymethyl)aminomethane. PEG 4600 is polyethylene glycol (4400 to 4800 average molecular weight). PPG 425 is polypropylene glycol with an average molecular weight of 425. If necessary, the pH was adjusted to the desired range (about 6.5 to about 7.5 for reactive dyes; about 8.5 to about 9.5 for acid dyes) with nitric acid.

|  | Ink Color and Dye CI Number | | | |
| --- | --- | --- | --- | --- |
|  | Red AR-361 | Yellow AY-79 | Green AG-28 | Blue AB-260 |
| Dye | 6.0 | 8.95 | 4.5 | 6.0 |
| Ethylene glycol | — | 23.0 | — | 20.0 |
| 1,5-Pentanediol | — | 20.0 | — | — |
| Caprolactam | 25.0 | — | — | 3.0 |
| 2-Pyrrolidone | 25.0 | — | 20.0 | 17.0 |
| Dipropylene glycol mono-n-propyl ether | — | — | 20.0 | — |
| Glycerol | — | 5.0 | 10.0 | 10.0 |
| PEG 4600 | 1.0 | — | 2.8 | 2.4 |
| Surfynol® 440 | 1.0 | 1.0 | 1.0 | 1.0 |
| Proxel™ GXL | 0.2 | 0.2 | 0.2 | 0.2 |
| Trizma | 0.2 | 0.2 | 0.2 | 0.2 |

-continued

|  | Violet V-48 | Black AK-194 | Magenta RR-245 | Orange RO-95 |
|---|---|---|---|---|
| Water | Bal. to 100% | Bal. to 100% | Bal. to 100% | Bal. to 100% |
| Properties |  |  |  |  |
| pH | 8.5 | 8.5 | 8.5 | 8.5 |
| Viscosity (dyne/cm) | 9 | 8.9 | 9 | 8.9 |
| Surface Tension (cP, 25° C.) | 38 | 37.5 | 30 | 36 |

|  | Ink Color and Dye Cl Number | | | |
|---|---|---|---|---|
|  | Violet V-48 | Black AK-194 | Magenta RR-245 | Orange RO-95 |
| Dye | 6.0 | 8.0 | 10.0 | 10.0 |
| Ethylene glycol | 23.0 | 22.0 | — | — |
| 1,5-Pentanediol | 20.0 | 19.0 | — | — |
| 2-Pyrrolidone | — | — | 5.3 | 5.3 |
| Glycerol % | 10.0 | 9.0 | 10.0 | 10.0 |
| PEG 4600% | 0.45 | 0.45 | — | — |
| Surfynol ® 440% | 1.0 | 1.0 | 0.25 | 0.25 |
| Proxel ™ GXL % | 0.2 | 0.2 | 0.2 | 0.2 |
| Trizma % | 0.2 | — | 0.5 | 0.5 |
| Propylene glycol | — | — | 20.0 | 20.0 |
| PPG 425 | — | — | 3.8 | 4.0 |
| Water | Bal. to 100% | Bal. to 100% | Bal. to 100% | Bal. to 100% |
| Properties |  |  |  |  |
| pH | 8.5 | 5.5 | 7.4 | 7.0 |
| Viscosity (dyne/cm) | 9.2 | 9.0 | 7.0 | 7.0 |
| Surface Tension (cP, 25° C.) | 35 | 36 | 39 | 39 |

Print Tests

A DuPont™ Artistri™ 2020 printer was equipped with the red, yellow, green, blue, violet, black, magenta and orange inks described above. The printer was also equipped with Solarmax® (200 denier nylon) fabric, which was pretreated according to previously incorporated US20050193499. A variety of prints were made which were post treated by exposure to saturated steam (15 psig, 120° C.) followed by washing twice, first in cold water for 5 minutes, then warm water (60° C.) for 10 minutes.

After post treatment, the prints all showed good color and good penetration so that the prints were of substantially similar color density on both sides of the fabric with little or no bleed.

It should be noted that penetration and bleed are, in part, related to choice of dye, and not all dyes have similarly good bleed characteristics under the same conditions. The dyes specified herein are particularly advantageous as regards penetration and bleed.

The prints were evaluated for lightfastness (Xenon lamp for 40 hours) according to AATCC method 16 (ISO 105-B02). Results are summarized in the following table. A higher number rating means better lightfastness (less color fade). For flags and banners, a rating of 3 is minimally acceptable, but a rating of 4 or 5 is preferred.

| Ink (Dye) | Light Fastness rating |
|---|---|
| Red Ink (AR-361) | 4-5 |
| Yellow Ink (AY-79) | 3-4 |
| Green Ink (AG-28) | 4 |
| Blue Ink (AB-260) | 4-5 |
| Violet Ink (AV-48) | 4 |
| Black Ink (AK-194) | 4 |

-continued

| Ink (Dye) | Light Fastness rating |
|---|---|
| Magenta Ink (RR-245) | 3-4 |
| Orange Ink (RO-95) | 4 |

As can be seen, the green ink containing Acid Green 28 dye had a favorable lightfastness rating of 4. Also, all eight inks listed had a lightfastness rating of at least three and thus the green ink in combination with any, or all, of these other inks constitutes a favorable ink set.

The green ink containing Acid Green 28 dye furthermore had a water fastness of 4-5 (AATCC 107, ISO 105-E1) when inkjet printed on SolarMax fabric; a 1A Wash fastness of 4-5 (AATCC 61, ISO 105-C06) and a crock fastness of 4 dry/3 wet, (AATCC 8, ISO 105-X12).

Other green dyes with good lightfastness include Acid Green 25 (light fastness of 6-7), Acid Green 81 (lightfastness of 6) and Acid Green 84 (lightfastness of 6), in accordance with ISO 105-B02 blue wool scale values (1-8 scale, 8 being most lightfast). For comparison, AG 28, used in the green ink above, is rated 6 on the blue wool scale. Inks with any of these green dyes are expected to provide relatively lightfast inks.

The invention claimed is:

1. A dye-based inkjet ink set comprising a first ink which is a green ink comprising a green dye in an aqueous vehicle, wherein said green dye is selected from the group consisting of Acid Green 28, Acid Green 25, Acid Green 81 Acid Green 84 and mixtures thereof; and a second ink which is a blue ink comprising Acid Blue 260 in an aqueous vehicle.

2. The dye-based ink set of claim 1, wherein the first ink comprises Acid Green 28.

3. The dye-based ink set of claim 1, wherein the first ink comprises Acid Green 28 in an amount of from about 2.5 wt % and about 7 wt %, based on the total weight of ink.

4. The dye-based ink set of claim 1, further comprising one or more of inks (a) through (f) defined as follows:
   (a) a yellow ink comprising Acid Yellow 79 dye in an aqueous vehicle;
   (b) a violet ink comprising Acid Violet 48 dye in an aqueous vehicle;
   (c) a black ink comprising Acid Black 194 in an aqueous vehicle;
   (d) a magenta ink comprising Reactive Red 245 in an aqueous vehicle;
   (e) an orange ink comprising Reactive Orange 95 in an aqueous vehicle, and/or
   (f) a red ink comprising Acid Red 361 in an aqueous vehicle.

5. The dye-based ink set of claim 4, comprising a third ink that is selected from the group consisting of inks (a) through (f), and a fourth ink that is selected from the group consisting of inks (a) through (f), provided that such fourth ink is not the same of inks (a) through (f) as selected for the third ink.

6. The dye-based ink set of claim 5, further comprising a fifth ink that is selected from the group consisting of inks (a) through (f), provided that such fifth ink is not the same of inks (a) through (f) as selected for the third and fourth inks.

7. The dye-based ink set of claim 1, further comprising:
   (a) a third ink that is a yellow ink comprising Acid Yellow 79 dye in an aqueous vehicle;
   (b) a fourth ink that is a violet ink comprising Acid Violet 48 in an aqueous vehicle;

(c) a fifth ink that is a black ink comprising Acid Black 194 in an aqueous vehicle;
(d) a sixth ink that is a magenta ink comprising Reactive Red 245 in an aqueous vehicle;
(e) a seventh ink that Is an orange ink comprising Reactive Orange 13 in an aqueous vehicle; and
(f) an eighth ink that is a red ink comprising Acid Red 361 in an aqueous vehicle.

8. The dye-based ink set of claim 3, wherein the blue ink comprises from about 4 wt % to about 8 wt % Acid Blue 260.

9. The dye-based ink set of claim 8, further comprising one or more of inks (a) through (f) defined as follows:
(a) a yellow ink comprising from about 7 wt % to about 11 wt % Acid Yellow 79 dye in an aqueous vehicle;
(b) a violet ink comprising from about 4 wt % to about 8 wt % Acid Violet 48 dye in an aqueous vehicle;
(c) a black ink comprising from about 6 wt % to about 10 wt % Acid Black 194 in an aqueous vehicle;
(d) a magenta ink comprising from about 8 wt % to about 12 wt % Reactive Red 245 in an aqueous vehicle;
(e) an orange ink comprising from about 5 wt % to about 15 wt % Reactive Orange 95 in an aqueous vehicle; and/or
(f) a red ink comprising from about 4 wt % to about 8 wt % Acid Red 361 in an aqueous vehicle.

10. The dye-based ink set of claim 9, further comprising all of inks (a) through (f).

11. The dye-based ink set of claim 1, which does not include a cyan ink.

12. A method for ink jet printing onto a fabric, comprising the steps of:
(a) providing an ink jet printer that is responsive to digital data signals;
(b) loading the printer with a polyamide fabric substrate to be printed;
(c) loading the printer with a dye-based inkjet ink set comprising a first ink which is a green ink comprising a green dye in art aqueous vehicle, wherein said green dye is selected from the group consisting of Acid Green 28, Acid Green 25, Acid Green 81, Acid Green 84 and mixtures thereof, and a second ink which is a blue ink comprising Acid Blue 260 in an aqueous vehicle; and
(d) printing onto the polyamide fabric substrate using the dye-based inkjet Ink set in response to the digital data signals.

13. The method of claim 12, further comprising the steps of:
(e) heating the printed fabric with steam-treatment to set the colors, and
(f) washing the steam-treated fabric.

14. The method of claim 12, wherein the polyamide fabric is flag and banner stock.

15. The method of claim 12, wherein the polyamide fabric substrate is printed to an ink coverage of from about 5 to about 17 grams of ink per square meter of fabric.

16. The method of claim 13, wherein the dye-based ink set comprises one or more of inks (a) through (f) defined as follows:
(a) a yellow ink comprising Acid Yellow 79 dye in an aqueous vehicle;
(b) a violet ink comprising Acid Violet 48 dye in an aqueous vehicle:
(c) a black ink comprising Acid Black 194 in an aqueous vehicle;
(d) a magenta ink comprising Reactive Red 245 in an aqueous vehicle;
(e) an orange ink comprising Reactive Orange 95 in an aqueous vehicle; and/or
(f) a red ink comprising Acid Red 361 in an aqueous vehicle.

17. The method of claim 16, wherein the dye-based ink further comprising all of inks (a) through (f).

18. The method of claim 12, wherein the dye-based ink set does not include a cyan ink.

19. A polyamide fabric article printed according the method of claim 12 or 13.

20. The polyamide fabric article of claim 19, wherein the polyamide fabric is flag and banner stock.

* * * * *